(12) United States Patent
Serra

(10) Patent No.: US 10,793,941 B2
(45) Date of Patent: Oct. 6, 2020

(54) PLASMA SPRAYING SYSTEM WITH ADJUSTABLE COATING MEDIUM NOZZLE

(71) Applicant: United Technologies Corporation, Farmington, CT (US)

(72) Inventor: Jessica L. Serra, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 43 days.

(21) Appl. No.: 15/027,049

(22) PCT Filed: Oct. 21, 2014

(86) PCT No.: PCT/US2014/061557
§ 371 (c)(1),
(2) Date: Apr. 4, 2016

(87) PCT Pub. No.: WO2015/061306
PCT Pub. Date: Apr. 30, 2015

(65) Prior Publication Data
US 2016/0237544 A1    Aug. 18, 2016

Related U.S. Application Data

(60) Provisional application No. 61/895,765, filed on Oct. 25, 2013.

(51) Int. Cl.
C23C 4/134     (2016.01)
H05H 1/42      (2006.01)
(Continued)

(52) U.S. Cl.
CPC .......... *C23C 4/134* (2016.01); *B05B 13/0278* (2013.01); *B05B 13/0431* (2013.01);
(Continued)

(58) Field of Classification Search
CPC ... B23K 3/06; B25J 5/02; B25J 18/005; B25J 18/007; B05D 3/141; B05B 13/0278
See application file for complete search history.

(56) References Cited

U.S. PATENT DOCUMENTS 3,479,208 A * 11/1969 Dubble ................... B05B 13/02
                                                    118/323
3,584,184 A *  6/1971 Tylko ........................ B23K 7/06
                                                    219/121.36
(Continued)

FOREIGN PATENT DOCUMENTS

CA         2198622        3/1996
CA         2745635        7/2010
(Continued)

OTHER PUBLICATIONS

Extended EP Search Report dated Oct. 13, 2016.

*Primary Examiner* — Karl Kurple
(74) *Attorney, Agent, or Firm* — Getz Balich LLC

(57) ABSTRACT

A plasma spraying system is provided for coating a substrate. The plasma spraying system includes a plasma gun, a nozzle and a mounting system. The plasma gun is adapted to direct plasma towards the substrate. The nozzle is adapted to direct coating medium into the plasma. The mounting system is adapted to rotate the nozzle to change an angle of incidence between the coating medium and the plasma.

1 Claim, 6 Drawing Sheets

(51) Int. Cl.
  *B05B 13/02* (2006.01)
  *B05B 13/04* (2006.01)
  *B05C 5/02* (2006.01)
  *B05D 3/14* (2006.01)
  *B25J 18/00* (2006.01)

(52) U.S. Cl.
  CPC .............. *B05D 3/141* (2013.01); *H05H 1/42* (2013.01); *B05C 5/0216* (2013.01); *B25J 18/007* (2013.01)

(56) References Cited

U.S. PATENT DOCUMENTS

| | | | |
|---|---|---|---|
| 3,935,418 A * | 1/1976 | Stand | B05B 7/226 219/121.47 |
| 4,328,257 A * | 5/1982 | Muehlberger | B05B 7/226 219/121.36 |
| 4,576,828 A * | 3/1986 | Walker, Jr. | C23C 4/137 118/668 |
| 4,604,306 A | 8/1986 | Browning | |
| 4,721,556 A | 1/1988 | Hsu | |
| 4,931,322 A * | 6/1990 | Yamamoto | B05B 12/122 427/424 |
| 5,014,644 A * | 5/1991 | Yamamoto | B05B 13/0292 118/314 |
| 5,121,027 A | 6/1992 | Hwan-Chul et al. | |
| RE34,213 E | 4/1993 | Hsu | |
| 5,233,153 A * | 8/1993 | Coats | B23K 10/027 219/121.47 |
| 5,240,745 A * | 8/1993 | Yamamoto | B05B 12/122 427/236 |
| 5,555,280 A * | 9/1996 | Cartry | B23K 15/0086 376/204 |
| 5,576,069 A | 11/1996 | Chen et al. | |
| 5,609,921 A | 3/1997 | Gitzhofer et al. | |
| 5,770,273 A * | 6/1998 | Offer | C23C 4/134 427/446 |
| 5,808,270 A | 9/1998 | Marantz et al. | |
| 5,869,146 A * | 2/1999 | McCluskey | C04B 41/009 427/452 |
| 6,213,049 B1 * | 4/2001 | Yang | B05B 7/226 118/723 DC |
| 6,478,234 B1 * | 11/2002 | Klein | B05B 15/08 239/132.3 |
| 6,491,967 B1 * | 12/2002 | Corderman | C23C 16/04 427/446 |
| 6,800,336 B1 * | 10/2004 | Fornsel | C23C 8/36 118/723 E |
| 6,827,634 B2 * | 12/2004 | Akedo | B24C 1/00 427/190 |
| 7,112,758 B2 * | 9/2006 | Ma | B05B 7/0416 219/121.47 |
| 7,115,832 B1 | 10/2006 | Blankenship et al. | |
| 7,491,431 B2 * | 2/2009 | Chiruvolu | C23C 8/00 427/582 |
| 7,763,823 B2 | 7/2010 | Zajchowski et al. | |
| 8,192,831 B2 | 6/2012 | Rosenzweig et al. | |
| 8,334,473 B2 | 12/2012 | Zajchowski et al. | |
| 8,343,589 B2 | 1/2013 | Kirby et al. | |
| 8,367,963 B2 | 2/2013 | Zajchowski et al. | |
| 8,367,967 B2 | 2/2013 | Zajchowski et al. | |
| 8,389,106 B2 | 3/2013 | Rosenzweig et al. | |
| 8,507,826 B2 | 8/2013 | Blankenship et al. | |
| 8,529,999 B2 | 9/2013 | Maloney et al. | |
| 2004/0226508 A1 | 11/2004 | Ma et al. | |
| 2005/0066890 A1 * | 3/2005 | Wetzel | B05B 13/0452 118/313 |
| 2005/0275141 A1 * | 12/2005 | Lange | B29C 45/1657 264/478 |
| 2006/0068109 A1 * | 3/2006 | Frankenberger | B41J 3/4073 427/256 |
| 2006/0108450 A1 * | 5/2006 | Klinkenberg | B05B 7/228 239/525 |
| 2006/0199024 A1 | 9/2006 | Lima et al. | |
| 2006/0222777 A1 | 10/2006 | Skoog et al. | |
| 2006/0289405 A1 | 12/2006 | Oberste-Berghaus et al. | |
| 2007/0184204 A1 | 8/2007 | Balagopal et al. | |
| 2009/0280298 A1 | 11/2009 | Rosenzweig et al. | |
| 2010/0159150 A1 | 6/2010 | Kirby et al. | |
| 2010/0159151 A1 | 6/2010 | Kirby et al. | |
| 2010/0252182 A1 * | 10/2010 | Rettig | B29C 53/588 156/189 |
| 2010/0304084 A1 | 12/2010 | Anand et al. | |
| 2010/0304181 A1 | 12/2010 | Anand et al. | |
| 2011/0045052 A1 | 2/2011 | Hill et al. | |
| 2011/0151132 A1 | 6/2011 | Nagaraj et al. | |
| 2011/0151219 A1 | 6/2011 | Nagaraj et al. | |
| 2011/0162805 A1 * | 7/2011 | Cheng | B25J 18/007 156/578 |
| 2011/0192246 A1 * | 8/2011 | Li | B25J 5/02 74/490.03 |
| 2011/0244216 A1 | 10/2011 | Meyer et al. | |
| 2011/0311716 A1 * | 12/2011 | Taylor | B05B 7/0408 427/8 |
| 2012/0017805 A1 | 1/2012 | Jordan et al. | |
| 2012/0035758 A1 * | 2/2012 | Hummel | B05B 15/68 700/192 |
| 2012/0052183 A1 | 3/2012 | Wu et al. | |
| 2012/0100299 A1 | 4/2012 | Zajchowski et al. | |
| 2012/0251777 A1 | 10/2012 | Duval et al. | |
| 2012/0258254 A1 | 10/2012 | Ma et al. | |
| 2012/0269958 A1 | 10/2012 | Subramanian et al. | |
| 2013/0004673 A1 * | 1/2013 | Ikeda | B05B 7/205 427/421.1 |
| 2013/0095340 A1 | 4/2013 | Sivakumar et al. | |
| 2013/0156940 A1 * | 6/2013 | Wu | C23C 16/52 427/9 |
| 2013/0288037 A1 * | 10/2013 | Sun | H01J 37/32082 428/312.8 |
| 2015/0283569 A1 * | 10/2015 | Linares | B05B 13/0457 427/427.2 |
| 2016/0082464 A1 * | 3/2016 | Osawa | B05B 5/081 428/172 |
| 2018/0029061 A1 * | 2/2018 | Hayama | B05B 15/70 |

FOREIGN PATENT DOCUMENTS

| | | |
|---|---|---|
| CA | 2785264 | 6/2011 |
| CA | 2785257 | 8/2011 |
| CA | 2772227 | 10/2012 |
| CN | 201195743 | 2/2009 |
| CN | 101250681 | 8/2010 |
| CN | 101183716 | 10/2010 |
| CN | 101619434 | 4/2011 |
| CN | 101250682 | 8/2011 |
| EP | 2508648 | 10/2012 |
| KR | 761000 | 10/2007 |
| WO | 1986006762 | 11/1986 |
| WO | 1996006957 | 3/1996 |
| WO | 2006092041 | 9/2006 |
| WO | 2006097649 | 9/2006 |
| WO | 2006116844 | 11/2006 |
| WO | 2007087426 | 8/2007 |
| WO | 2009081120 | 7/2009 |
| WO | 2009097834 | 8/2009 |
| WO | 2010080241 | 7/2010 |
| WO | 2010130109 | 11/2010 |
| WO | 2011078972 | 6/2011 |
| WO | 2011100019 | 8/2011 |
| WO | 2012082902 | 7/2012 |
| WO | 2012138891 | 10/2012 |

* cited by examiner

PLASMA SPRAYING SYSTEM WITH ADJUSTABLE COATING MEDIUM NOZZLE

CROSS-REFERENCE TO RELATED APPLICATIONS

This application claims priority to PCT Patent Application No. PCT/US14/061557 filed Oct. 21, 2014, which is related and claims priority to U.S. Provisional Patent Application No. 61/895,765 filed Oct. 25, 2013, which are hereby incorporated herein by reference in their entireties.

BACKGROUND OF THE INVENTION

1. Technical Field

This disclosure relates generally to plasma spraying systems and processes.

2. Background Information

A coating may be applied to a surface of a substrate using a plasma spraying system. During system operation, dry coating particles may be directed by a nozzle (also referred to as a "powder injector" or a "powder port") into a stream of plasma, which carries and applies the coating particles onto the substrate surface. Alternatively, the coating particles may be disposed within a carrier liquid before being directed into the plasma stream by the nozzle.

The nozzle is typically fixedly mounted to a support of the plasma spraying system by a plurality of bolts. It may be difficult and time consuming therefore to adjust the position of the nozzle relative to the plasma stream. Notably, the nozzle position may affect how the coating particles are entrained within the plasma stream and, thus, various properties of the coating.

There is a need in the art for improved plasma spraying systems and processes.

SUMMARY OF THE DISCLOSURE

According to an aspect of the invention, a plasma spraying system is provided for coating a substrate. This plasma spraying system includes a plasma gun, a nozzle and a mounting system. The plasma gun is adapted to direct plasma towards the substrate. The nozzle is adapted to direct coating medium into the plasma. The mounting system is adapted to rotate the nozzle to change an angle of incidence between the coating medium and the plasma.

According to another aspect of the invention, another plasma spraying system is provided that includes a plasma gun, a nozzle and a mounting system. The plasma gun is adapted to direct plasma along a first trajectory. The nozzle is adapted to direct coating medium along a second trajectory into the plasma. The mounting system is adapted to move the nozzle to change an angle between the first trajectory and the second trajectory.

According to another aspect of the invention, a process is provided for plasma spraying a substrate. This process includes directing plasma from a plasma gun towards the substrate. Coating medium is directed from the nozzle into the plasma. The nozzle is rotated to change an angle of incidence between the coating material and the plasma.

The coating medium may be configured as or otherwise include a suspension of coating particles within a carrier liquid. Alternatively, the coating medium may be configured as or otherwise include dry coating particles.

The mounting system may include a rotary joint adapted to rotate the nozzle to change the angle of incidence.

The mounting system may be adapted to slide the nozzle to change a distance between the nozzle and the plasma gun.

The mounting system may include a telescoping joint adapted to move the nozzle to change a distance between the nozzle and the plasma gun.

The mounting system may be adapted to rotate the nozzle at least partially circumferentially around the plasma gun.

The mounting system may include a track and a carriage. The track may extend at least partially circumferentially around the plasma gun. The carriage may be adapted to move the nozzle along the track.

The plasma gun may include a gas nozzle and an igniter. The gas nozzle may be adapted to direct gas (e.g., inert gas) towards the substrate. The igniter may be adapted to ignite the gas to provide the plasma.

The plasma spraying system may include a coating medium reservoir and a pump. This pump may be adapted to direct the coating medium from the reservoir to the nozzle.

The nozzle may be rotated before the plasma is directed from the plasma gun. Alternatively, the nozzle may be rotated while the plasma is being directed from the plasma gun.

The process may include moving the nozzle along an axis to change a distance between the nozzle and the plasma gun. The process may also or alternatively include rotating the nozzle at least partially circumferentially around the plasma gun.

The foregoing features and the operation of the invention will become more apparent in light of the following description and the accompanying drawings.

DETAILED DESCRIPTION OF THE INVENTION

Figure 1:
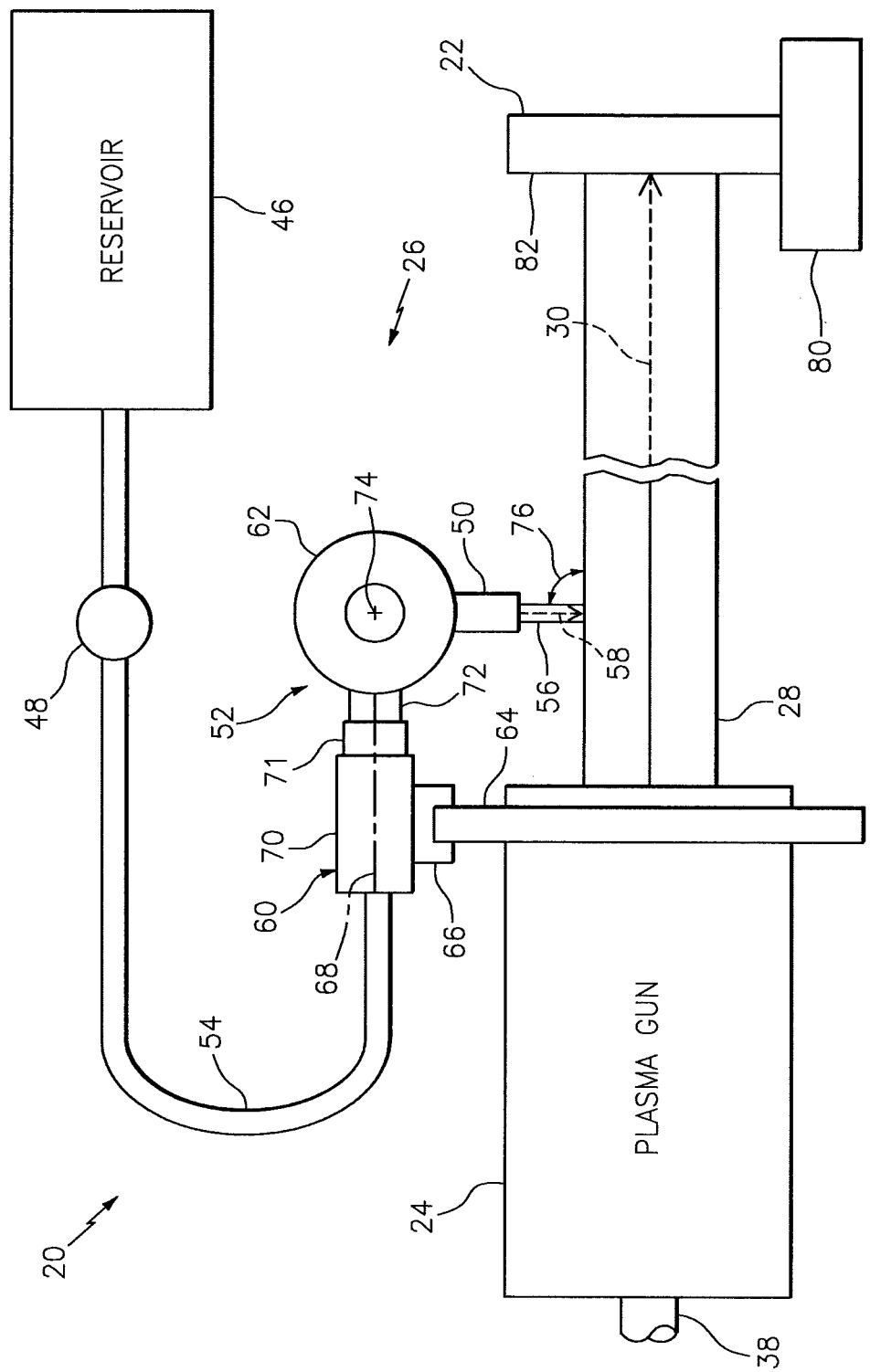
FIG. 1 is a side illustration of a plasma spraying system with its coating medium nozzle in a first position.
Figure 2:
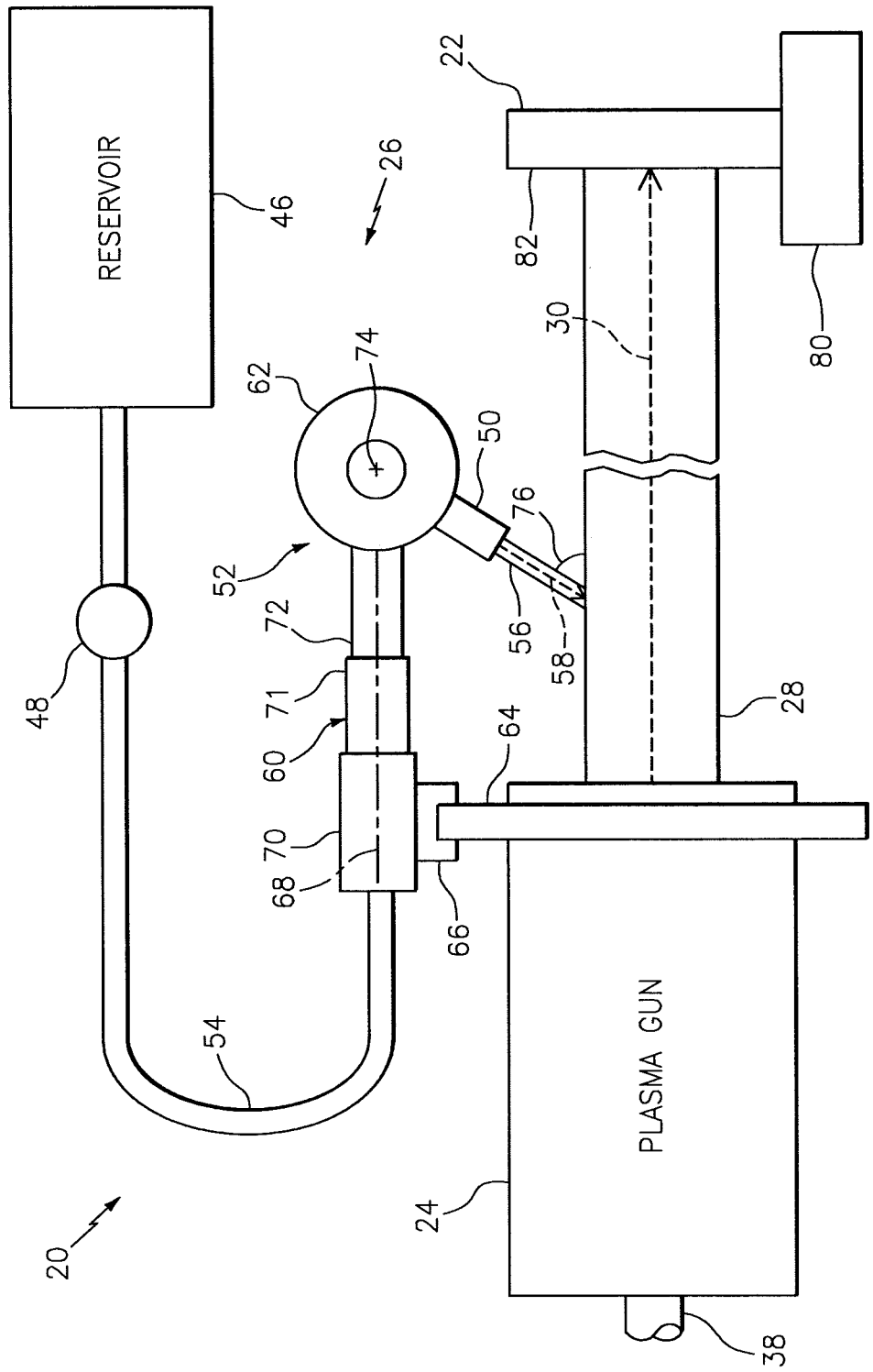
FIG. 2 is a side illustration of the plasma spraying system with its coating medium nozzle in a second position.
Figure 3:
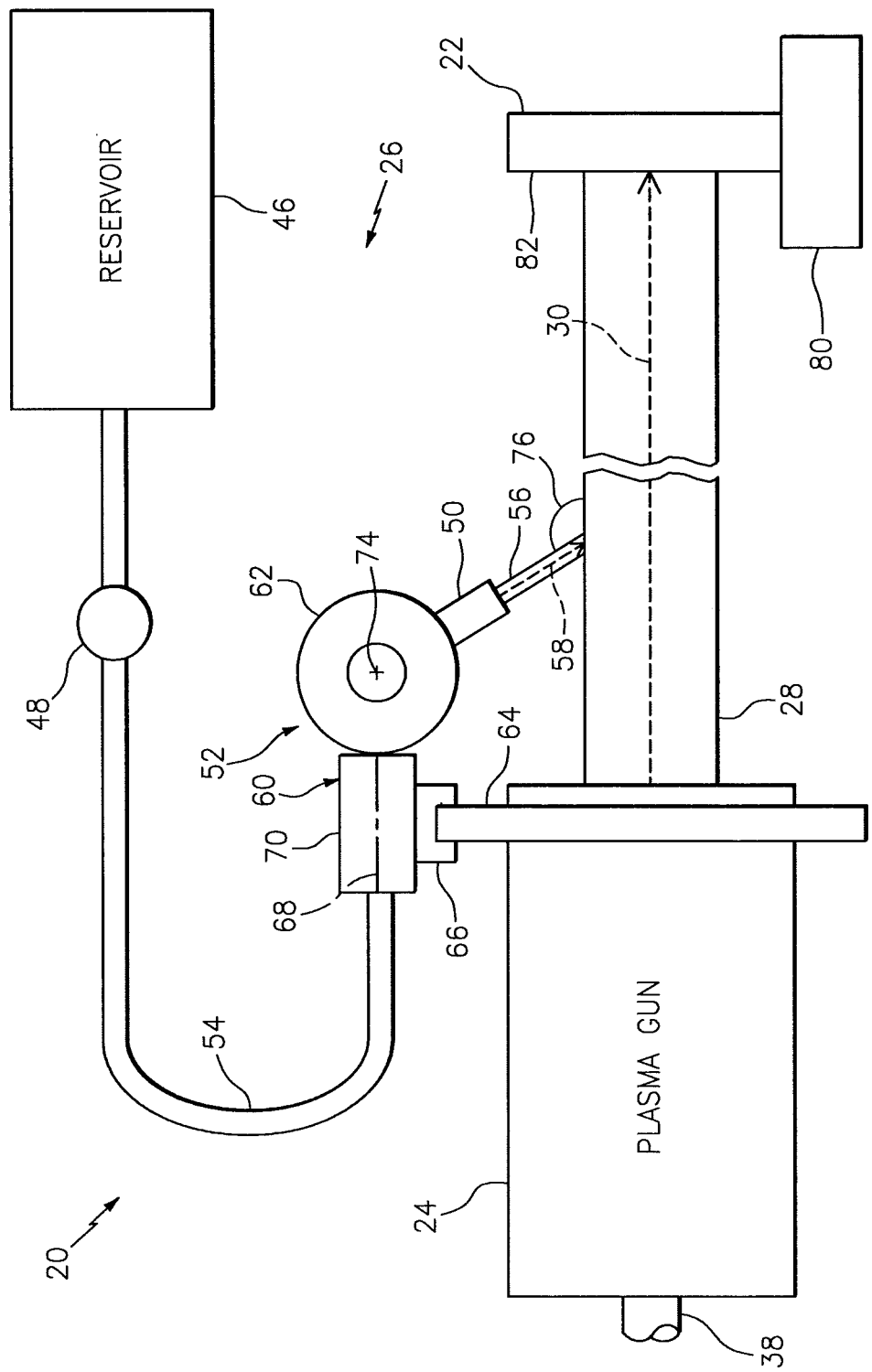
FIG. 3 is a side illustration of the plasma spraying system with its coating medium nozzle in a third position.

FIGS. 1-3 illustrate a plasma spraying system 20 for coating a substrate 22. The plasma spraying system 20 includes a plasma gun 24 configured with a coating medium feed system 26.

Figure 4:
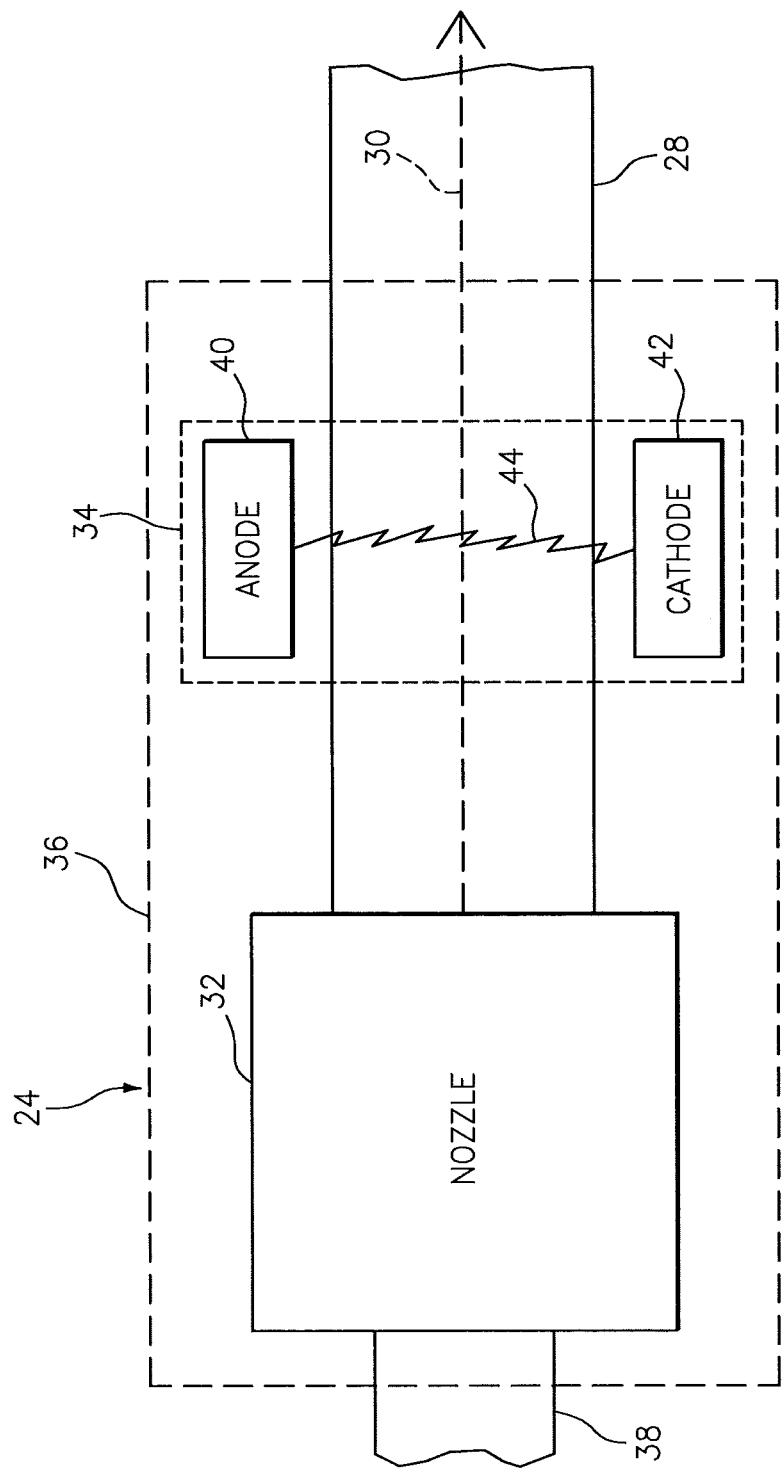
FIG. 4 is a side illustration of a plasma gun for the plasma spraying system.

The plasma gun 24 is adapted to direct a stream of plasma 28 along a trajectory 30 towards the substrate 22. Referring to FIG. 4, the plasma gun 24 includes a gas nozzle 32 and an igniter 34, which are arranged within a plasma gun housing 36.

The gas nozzle 32 is fluidly coupled with a gas conduit 38, and adapted to receive gas from the gas conduit 38, where the gas may be inert gas (e.g., Argon gas, Nitrogen gas, etc.) or any other type of gas. The gas nozzle 32 is also adapted to direct a stream of the received gas along the trajectory 30 within the plasma gun housing 36 to be ignited by the igniter

34. In other embodiments, however, the gas nozzle 32 may be adapted to direct the stream of the received gas out of the plasma gun housing 36 where the igniter 34 is located outside of the housing 36.

The igniter 34 is adapted to ignite the gas stream to provide the plasma stream 28. The igniter 34 of FIG. 4, for example, includes an anode 40 and a cathode 42. The anode 40 and the cathode 42 are adapted to generate an electrical arc 44 that ignites the gas stream to provide the plasma stream 28.

Referring to FIGS. 1-3, the feed system 26 includes a coating medium reservoir 46 (e.g., a tank or a hopper), a coating medium pump 48, and a coating medium nozzle 50. The feed system 26 also includes a mounting system 52 for adjustably positioning the coating medium nozzle 50 relative to the plasma gun 24.

The coating medium reservoir 46 is adapted to contain liquid or solid (e.g., powder) coating medium. The coating medium may be a suspension of coating particles within a carrier liquid. Alternatively, the coating medium may be dry coating particles; i.e., coating particles that are not carried within a liquid. The coating particles may include or consist essentially of ceramic particles such as, for example, yttria stabilized zirconia particles and/or nickel alloy particles. The present invention, however, is not limited to any particular coating particle materials. Examples of the carrier liquid include, but are not limited to, alcohol and/or water.

The coating medium pump 48 is fluidly coupled between the coating medium reservoir 46 and the coating medium nozzle 50. The coating medium pump 48 of FIGS. 1-3, for example, is fluidly coupled inline with a coating medium conduit 54. This coating medium conduit 54 extends and is fluidly coupled between the coating medium reservoir 46 and the mounting system 52, which is fluidly coupled with the coating medium nozzle 50 as described below in further detail. Alternatively, the coating medium conduit 54 may be fluidly coupled directly to the nozzle or indirectly through one or other non-mounting system components. Referring again to FIGS. 1-3, the coating medium pump 48 is adapted to direct the coating medium from the coating medium reservoir 46 to the coating medium nozzle 50 through the coating medium conduit 54 and the mounting system 52.

The coating medium nozzle 50 is adapted to receive the coating medium from the coating medium pump 48 and, thus, the coating medium reservoir 46. The coating medium nozzle 50 is also adapted to direct a stream of the received coating medium 56 along a trajectory 58 into the plasma stream 28.

The mounting system 52 includes a telescoping joint 60, a rotary joint 62, a curved track 64 and a carriage 66. The telescoping joint 60 is adapted to move (e.g., slide) the coating medium nozzle 50 along an axis 68, which may be substantially parallel with the trajectory 30. In this manner, the telescoping joint 60 and, thus, the mounting system 52 are adapted to change (e.g., increase or decrease) an axial distance between the coating medium nozzle 50 and the plasma gun 24.

The telescoping joint 60 includes a plurality of tubular segments 70-72 that fluidly couple the coating medium conduit 54 to the rotary joint 62. The intermediate segment 71 is slideably nested within and sealingly engaged with the outer segment 70. The inner segment 72 is slideably nested within and sealingly engaged with the intermediate segment 71. The telescoping joint 60 may also include one or more locks, which may limit or prevent movement between one or more of the segments 70-72.

The rotary joint 62 is adapted to rotate the coating medium nozzle 50 about an axis 74, which may be substantially perpendicular to the axis 68 and the trajectory 30. In this manner, the rotary joint 62 and, thus, the mounting system 52 are adapted to change an angle of incidence 76 between the coating medium stream 56 and the plasma stream 28; e.g., an angle between the trajectories 30 and 58. The rotary joint 62, for example, may change the angle of incidence 76 between the coating medium stream 56 and the plasma stream 28 about plus/minus forty-five degrees)(+/−45°. In another example, the rotary joint 62 may change the angle of incidence 76 between the coating medium stream 56 and the plasma stream 28 about plus/minus five degrees) (+/−5°. The present invention, however, is not limited to the foregoing values.

The rotary joint 62 may be configured as a ball joint. The rotary joint 62 includes a flow path that extends and is fluidly coupled between the telescoping joint 60 and the coating medium nozzle 50. The rotary joint 62 may also include a lock, which may limit or prevent rotation of the coating medium nozzle 50 about the axis 74.

Figure 6:
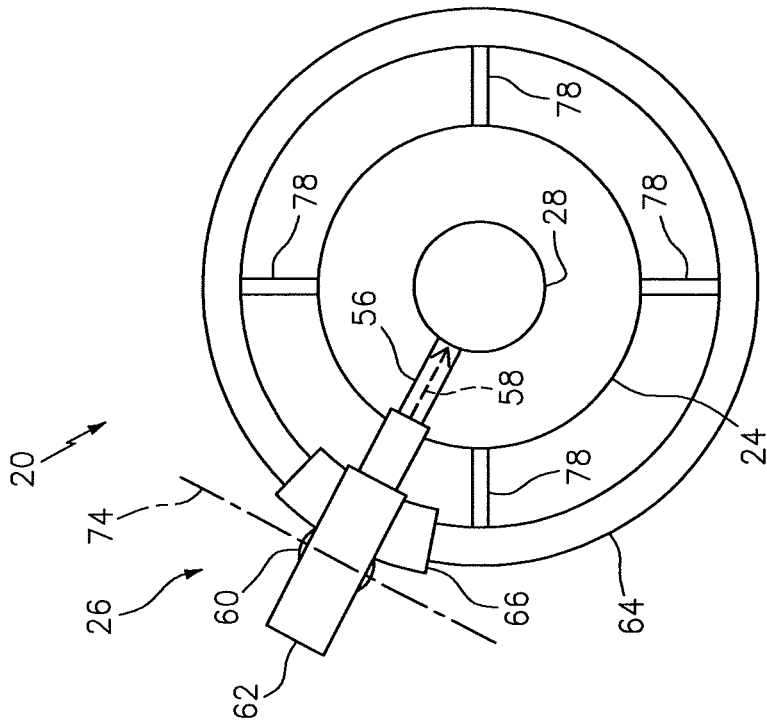
FIG. 6 is a front illustration of the plasma spraying system with its coating medium nozzle in a fourth position.
Figure 5:
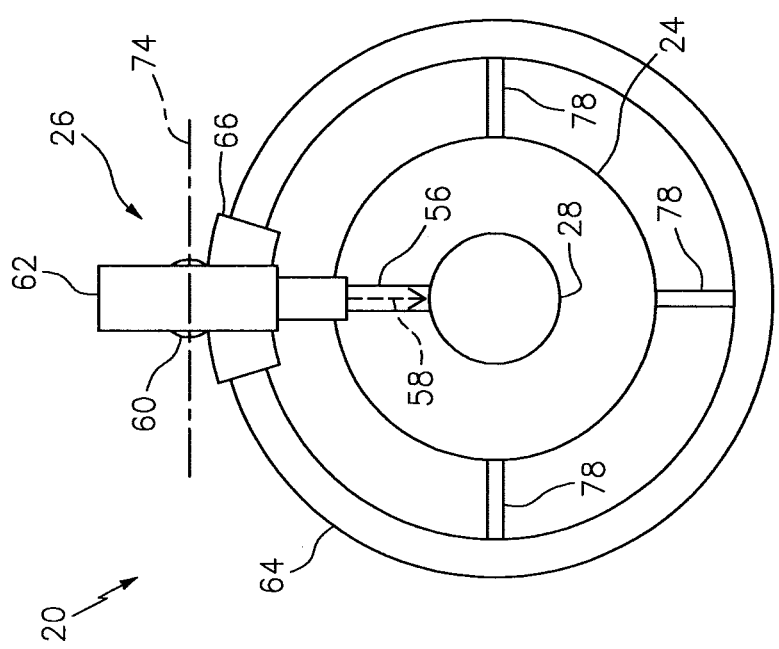
FIG. 5 is a front illustration of the plasma spraying system with its coating medium nozzle in the first position.

Referring to FIGS. 5 and 6, the track 64 extends completely (or partially) circumferentially around the plasma gun 24 such that, for example, the track 64 is concentric with the plasma gun 24. The track 64 may be attached to the plasma gun 24 by one or more mechanical attachments 78 (e.g., struts, pylons or studs). Alternatively, the track 64 may be bonded or otherwise attached directly to the plasma gun 24, or another adjacent structure.

The carriage 66 is connected to the coating medium nozzle 50 and mated with the track 64. The carriage 66 is adapted to slide or otherwise move along the track 64. In this manner, the carriage 66 and, thus, the mounting system 52 are adapted to rotate the coating medium nozzle 50 at least partially circumferentially around the plasma gun 24. The carriage 66, for example, may rotate the coating medium nozzle 50 about three hundred and sixty degrees) (360° circumferentially around the plasma gun 24. In another example, the carriage 66 may rotate the coating medium nozzle 50 about one hundred and eighty degrees)(180° circumferentially around the plasma gun 24. The carriage 66 may also include a lock, which may limit or prevent rotation of the nozzle about the plasma gun 24.

Figure 7:
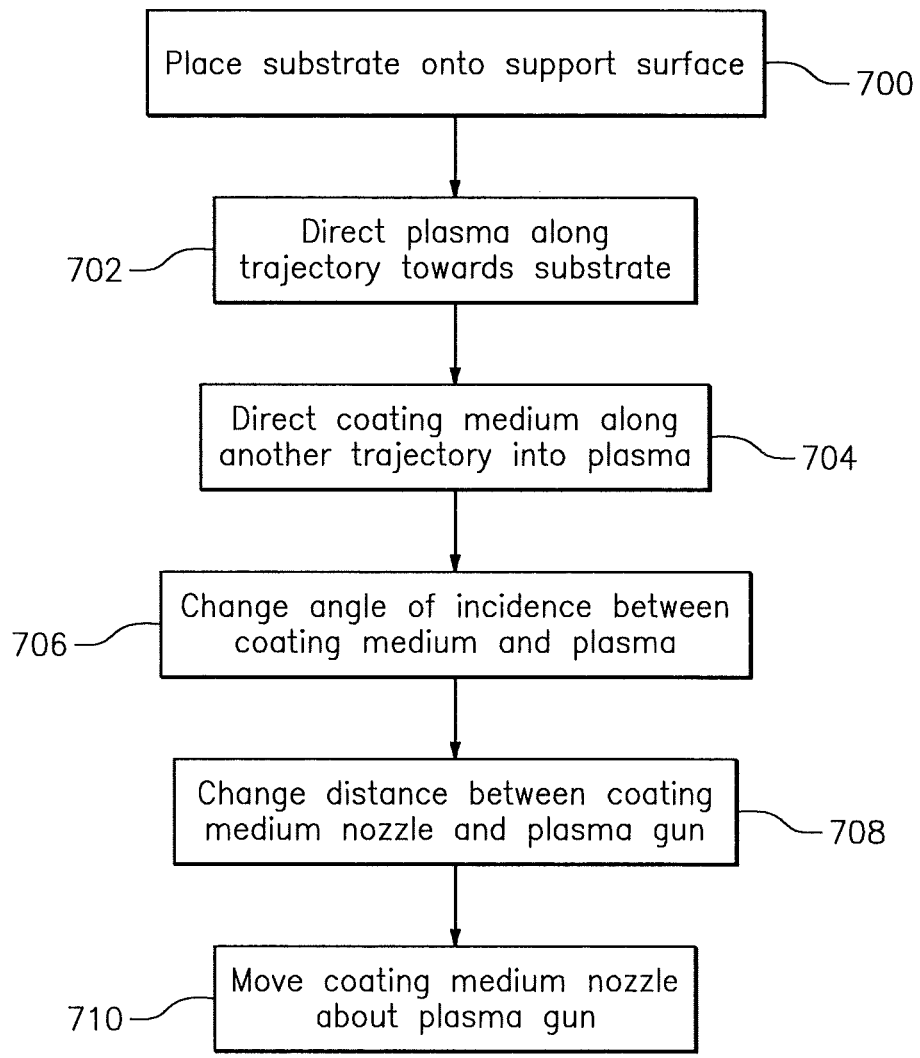
FIG. 7 is a flow diagram of a process for applying a coating to a substrate.

FIG. 7 is a flow diagram of a process for applying a coating onto at least a portion of the substrate 22 using the plasma spraying system 20 of FIGS. 1-3. In step 700, the substrate 22 is placed on a support surface 80. This substrate 22 may be configured as a rotor blade (e.g., a turbine blade, a compressor blade, or a fan blade) of a turbine engine. The substrate 22 may alternatively be configured as a stator vane, a combustor wall or a flow path wall of a turbine engine. The present invention, however, is not limited to any particular substrate configurations.

In step 702, the plasma gun 24 directs the plasma stream 28 along the trajectory 30 towards the substrate 22. The gas nozzle 32 of FIG. 4, for example, directs the gas stream along the trajectory 30 through the igniter 34. The anode 40 and the cathode 42 generate the electrical arc 44, which ignites the gas stream and provides the plasma stream 28.

In step 704, the feed system 26 of FIGS. 1-3 directs the coating medium stream 56 along the trajectory 58 into the plasma stream 28. The coating medium pump 48, for example, directs at least some of the coating medium within the coating medium reservoir 46 to the coating medium nozzle 50. The coating medium nozzle 50 directs the received coating medium along the trajectory 58 into the plasma stream 28. The plasma stream 28 subsequently carries and applies the coating medium onto a surface 82 of the substrate 22.

In step 706, the mounting system 52 moves the coating medium nozzle 50 to change the angle of incidence 76 between the coating medium stream 56 and the plasma stream 28. The rotary joint 62, for example, may rotate the coating medium nozzle 50 about the axis 74 from the angular position of FIG. 1 to the angular position of FIG. 2 to decrease the angle of incidence 76. Alternatively, the rotary joint 62 may rotate the coating medium nozzle 50 about the axis 74 from the angular position of FIG. 1 to the angular position of FIG. 3 to increase the angle of incidence 76. The coating medium nozzle 50 movement may be performed manually by an operator and/or automatically via an actuator in signal communication with a controller.

By changing the angle of incidence 76, the mounting system 52 may influence entrainment of the coating particles within the plasma stream 28 and thereby change properties of the coating. For example, the coating particles may become more entrained within the plasma stream 28 as the angle of incidence 76 decreases, which may increase coating density. In contrast, the coating particles may be less entrained within the plasma stream 28 as the angle of incidence 76 increases, which may decrease coating density.

In step 708, the mounting system 52 moves the coating medium nozzle 50 to change the distance between the coating medium nozzle 50 and the plasma gun 24. The telescoping joint 60, for example, may slide the coating medium nozzle 50 along the axis 68 from the axial position of FIG. 1 to the axial position of FIG. 2 to increase the distance between the coating medium nozzle 50 and the plasma gun 24. Alternatively, the telescoping joint 60 may slide the coating medium nozzle 50 along the axis 68 from the axial position of FIG. 1 to the axial position of FIG. 3 to decrease the distance between the coating medium nozzle 50 and the plasma gun 24. In this manner, the mounting system 52 may change (or maintain) a location of where the coating medium stream 56 interfaces with the plasma stream 28. This location may have a similar influence on coating particle entrainment and, thus, coating properties as described above. In addition, the mounting system 52 may prevent the coating medium stream 56 from hitting the plasma gun 24 when the coating medium nozzle 50 is rotated towards the plasma gun 24.

In step 710, the mounting system 52 of FIGS. 5 and 6 moves the coating medium nozzle 50 about the plasma gun 24. The carriage 66, for example, may slide along the track 64 to change an angular position of the coating medium nozzle 50 relative to the plasma stream 28. In this manner, the mounting system 52 may ensure the coating is substantially evenly applied to the substrate surface 82 where, for example, there is a higher density of entrained coating particles towards one side of the plasma stream 28 than towards another side of the plasma stream 28.

In some embodiments, one or more of the steps 706, 708 and 710 may be performed before one or more of the steps 702 and 704. In some embodiments, one or more of the foregoing steps may be performed substantially simultaneously. In some embodiments, one or two of the steps 706, 708 and 710 may be omitted from the process.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A plasma spraying system for coating a substrate, the system comprising: a plasma gun adapted to direct a stream of a plasma along a first trajectory towards the substrate; a nozzle adapted to direct a coating medium into the stream of the plasma; and a mounting system adapted to rotate the nozzle to change an angle of incidence between the coating medium and the stream of the plasma; the mounting system including a curved track and a carriage mounted to the curved track; the curved track extending along a curved trajectory at least partially circumferentially around the first trajectory of the stream of the plasma such that the curved track is concentric with the plasma gun; and the carriage adapted to move the nozzle along the curved track, said mounting system including a telescoping joint adapted to move the nozzle along a first axis parallel with the first trajectory of the stream of the plasma; and a rotary joint adapted to rotate the nozzle about a second axis perpendicular to the first axis and the first trajectory of the stream of the plasma.

* * * * *